No. 661,680.  
F. ANDREAS.  
LOCK HINGE.  
(Application filed May 18, 1900.)  
Patented Nov. 13, 1900.

(No Model.)

Attest:  
Wm. A. Scott.  
George Bakewell.

Inventor  
Frederick Andreas  
by Bakewell & Cornwall  
attys.

UNITED STATES PATENT OFFICE.

FREDERICK ANDREAS, OF ST. LOUIS, MISSOURI, ASSIGNOR OF ONE-HALF TO JOSEPH W. SCHILLING, OF SAME PLACE.

LOCK-HINGE.

SPECIFICATION forming part of Letters Patent No. 661,680, dated November 13, 1900.

Application filed May 18, 1900. Serial No. 17,088. (No model.)

*To all whom it may concern:*

Be it known that I, FREDERICK ANDREAS, a citizen of the United States, residing at the city of St. Louis, State of Missouri, have invented a certain new and useful Improvement in Hinges, of which the following is a full, clear, and exact description, such as will enable others skilled in the art to which it appertains to make and use the same, reference being had to the accompanying drawings, forming part of this specification, in which—

Figure 1:
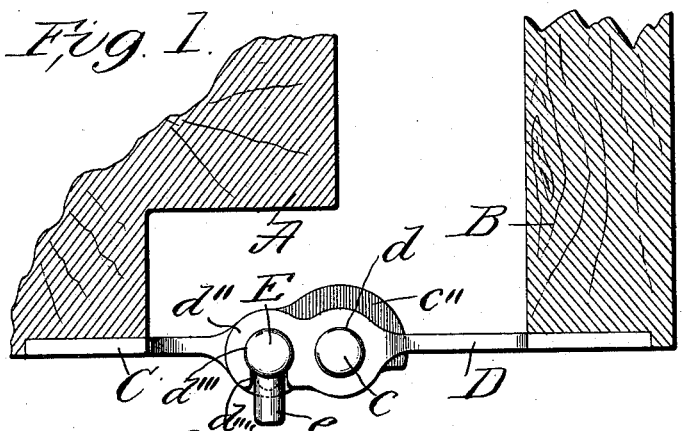
Figure 2:
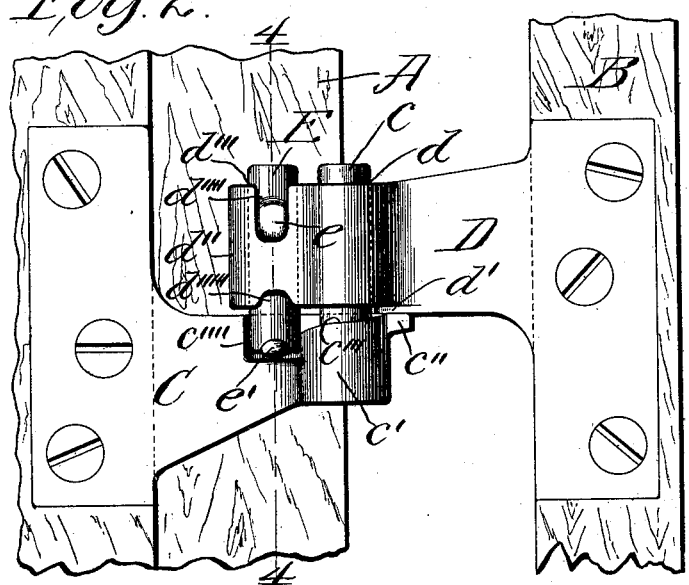
Figure 4:
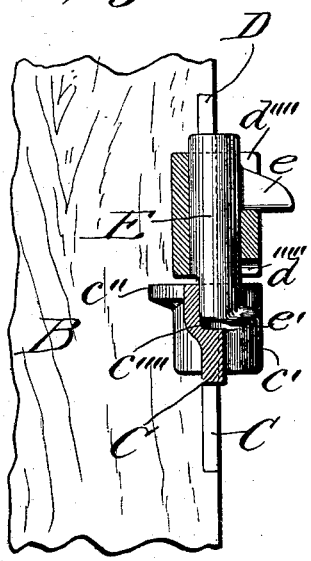
Figure 3:
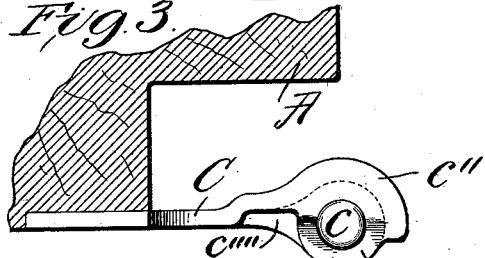

Figure 1 is a top plan view of my improved hinge, showing a portion of the window casing and shutter in section. Fig. 2 is an elevational view of my improved hinge in position. Fig. 3 is a top plan view of the male member of the hinge; and Fig. 4 is a sectional view on line 4 4, Fig. 2.

This invention relates to a new and useful improvement in hinges of that type commonly known as "lock-hinges," and is designed particularly for use in connection with window-shutters.

The prime object of my invention is to enable the shutter to be locked in its open position, and when the shutter is closed it may unfasten and swing inwardly without requiring the weight of the shutter to be lifted in order to override the locking projections on the hinges.

With this object in view the invention consists in the construction, arrangement, and combination of the several parts, all as will hereinafter be described and afterward pointed out in the claim.

In the drawings, A indicates a portion of a window-casing, and B a portion of the shutter.

C indicates what I will term the "male" member of the hinge, which is preferably secured to the casing A by suitable means. This, as well as the other member of the hinge, is preferably made of cast metal, the member C being provided with the usual spindle $c$, projecting upwardly from its outer end or from a hub portion $c'$. This hub portion is partially formed by a lateral flange $c''$, that portion of the upper face of the hub in which is included said flange being substantially on a horizontal plane, while the other or near edge of the hub portion is formed with a cam-face $c'''$, as shown more clearly in Figs. 2 and 3.

$c''''$ indicates a socket formed in the member C and adjacent to the hub portion.

D indicates what may be designated as the "female" member of the hinge. This member D is preferably attached to the shutter and provided with an eye or opening $d$ in its outer end for receiving the spindle $c$. The lower face of member D adjacent to the eye is provided with a rib or projection $d'$, designed when the shutter is open to rest upon the highest face of the hub portion of the member C; but when the shutter is being closed this projection rides down the cam-face of the member C, due to the weight of the shutter, and thus after the shutter is once started in its closing movement its tendency is to swing inwardly to a closed position. Of course when the shutter is being opened the projection $d'$ rides up the inclination.

$d''$ indicates an extension of the member D, which is preferably formed with a vertical opening $d'''$, said extension being notched as at $d''''$ and $d'''''$, as shown in Fig. 2.

E indicates a locking-bolt mounted in the vertical opening of the extension of member D, said locking-bolt being provided with a lateral extension $e$ at its upper end, designed to operate in the notch $d''''$ to prevent the locking-bolt from turning and also serves as a handle by which said bolts may be elevated. The lower end of the locking-bolt is preferably bent outwardly or provided with a projection $e'$, designed to fit in the notch $d'''''$ and prevent the locking-bolt from being removed.

In operation the locking-bolt is designed to fit in the socket $c''''$ when the shutter is open and prevent the same from being accidentally closed. When it is desired to close the shutter, it is only necessary to elevate the locking-bolt by a slight outward pressure thereon to turn the shutter until the projection $d'$ strikes the inclined face $c'''$, when the tendency of the shutter will be to close of its own accord. When the shutter is in a closed position, the locking-bolt E rests upon the flange $c''$, and when the shutter is opened again the locking-bolt rides idly over said flange until it occupies a position in line with the socket $c''''$, into which it drops by gravity, as will be obvious.

The hinge above described is designed to be used as the lower hinge of the shutter, the upper hinge being plain. It will be seen that my improved hinge is simple in construction, that it can be cheaply made, that it has but one more part than the ordinary lock-hinge in common use, and that when the shutter is open it is absolutely locked against being closed by the wind, which is not true of the ordinary lock-hinges in general use. Furthermore, it is not necessary in closing the shutter to elevate the shutter above the locking projection, as is now commonly practiced with respect to the hinges on the market with which I am familiar, it being only necessary to raise the locking-bolt and start the shutter in its closing movement, the shutter having a tendency to close itself, as before explained.

Having thus described my invention, what I claim, and desire to secure by Letters Patent, is—

In a lock-hinge, the combination with the member C having a spindle $c$ projecting upwardly from a hub portion $c'$ at its outer end, a track-flange $c''$ formed on the hub portion at the base of the spindle, a portion of said track-flange being arranged on a horizontal plane and the remaining portion of said flange being inclined to form a cam-face $c'''$, of a member D provided with an eye $d$ for receiving the spindle, a projection $d'$ adjacent to said eye and designed to coöperate with the cam-face $c'''$ of the track-flange, an extension $d''$ provided with an opening for the reception of a locking-bolt, and a locking-bolt provided with projections $e$ and $e'$, said locking-bolt designed in one position of the hinge to coöperate with the member C and lock the hinge against movement, and in another position of said members, said locking-bolt rides upon, and is held in an elevated position by, the horizontal portion of the track-flange $c''$; substantially as described.

In testimony whereof I hereunto affix my signature, in the presence of two witnesses, this 15th day of May, 1900.

FREDERICK ANDREAS.

Witnesses:
WM. H. SCOTT,
A. S. GRAY.